though those skilled in the art recognize that the various amounts, proportions and formulas given are merely exemplary and are not to be construed as limiting the invention.

United States Patent Office 3,423,314
Patented Jan. 21, 1969

3,423,314
ANTISTATIC LUBRICANT AS A PROCESS FINISH FOR SYNTHETIC FIBERS
James K. Campbell, Midland, Mich., assignor to Dow Corning Corporation, Midland, Mich., a corporation of Michigan
No Drawing. Filed Jan. 19, 1966, Ser. No. 521,493
U.S. Cl. 252—8.6    10 Claims
Int. Cl. B44d 5/00

ABSTRACT OF THE DISCLOSURE

An aqueous emulsion consisting of water, a dimethylpolysiloxane fluid, a deliquescent salt (calcium chloride and lithum chloride) and a polyhydric solubilizing agent. The emulsion is useful for treating synthetic fibers to impart exceptional antistatic and lubricity characteristics to the surface of the fiber.

---

This invention relates to new compositions of matter. More particularly it is concerned with a synthetic fiber bearing a novel finish to minimize the accumulation of charges of static electricity during finishing operations while serving the dual purpose of exhibiting superior lubricity characteristics.

One common disadvantage of synthetic fibers, yarns, and the like, is that they tend to develop static electrical charges. This feature is particularly objectionable during the manufacture of said fiber. During the manufacturing process, static charges from the fibers interfere with convenient handling during spinning, weaving, reeling, and the like operations. Furthermore, such products tend to collect dust and lint, and in addition, the electrical charge itself is quite bothersome.

While dimethylpolysiloxane is an excellent lubricant for synthetic fibers, the use of this material on the fibers fails to reduce the accumulation of static electricity. In fact in numerous cases, the dimethylpolysiloxane fluid actually enhances the static problem. It has been found that blending well known organic antistatic agents with dimethylpolysiloxane fluid generally results in a finish which exhibits the worst possible effects of both ingredients, i.e., poor lubrication and little, if any static protection.

It is an object of the present invention to provide a novel emulsion which will impart exceptional antistatic protection to a synthetic fiber without causing other objectionable changes in their properties.

Another object is to provide a novel emulsion which possesses superior lubricity characteristics as well as exceptional static protection.

A further object is to provide a treated synthetic fiber which eliminates accumulation of static electricity while maintaining superior lubricity characteristics and otherwise possesses substantially the same properties as the identical fiber prior to treatment.

A still further object is to provide a process for applying said novel emulsion to the surface of the synthetic fiber.

The exact nature of the invention as well as other objects and advantages thereof will be readily apparent from consideration of the following detailed description.

This invention relates to an aqueous emulsion consisting essentially of water having dispersed therein, (A) a dimethylpolysiloxane fluid,
(B) from 1.0 to 20.0 parts of a deliquescent salt selected from the group consisting of calcium chloride and lithium chloride based on 100 parts of (A) by weight, and
(C) from 20 to 40 parts of a polyhydric solubilizing agent for the deliquescent salt based on 100 parts of (A) by weight.

The siloxane fluid (A) above is easily and readily obtained by a number of methods well known by those skilled in the art. For the purpose of this invention the fluid can be linear, branched or cyclic in structure and it may or may not be endblocked with triorganosilyl groups. Thus, the fluid can have the formula

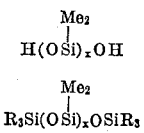

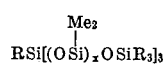

or

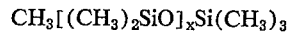

in which R is a hydrocarbon radical and $x$ is an integer preferably of such value that the viscosity of the fluid is at least 20 cps. at 25° C. Specific examples of such fluids are those of the formulae

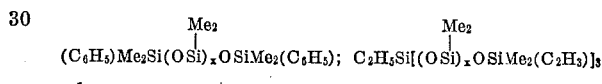

and $$CH_3[(CH_3)_2SiO]_xSi(CH_3)_3$$

To successfully practice this invention, the deliquescent salt (B) must be selected from the group consisting of calcium chloride and lithium chloride. Other possible related deliquescent salts such as calcium sulphate and magnesium perchlorate were investigated, however for reasons not readily apparent they proved to be both ineffective in reducing or preventing accumulation of static electricity and failed to enhance the desired lubricity.

The amount of calcium chloride or lithium chloride used in this invention is critical and must be maintained within certain limits. Since an excess of calcium chloride or lithium chloride imparts detrimental effects to the silicone properties it is imperative that the maximum amount of calcium chloride or lithium chloride is 20 parts based on 100 parts of (A). The minimum quantity of deliquescent salt employed, however, is not critical with the exception that it must be present in sufficient amount so that the desired antistatic and lubricity characteristics are obtained. Thus, for purposes of this invention, as little as 2.0 parts of (B) per 100 parts of (A) will suffice, although for best qualitative results from 4.0 to 8.0 parts of (B) per 100 parts of (A) is to be preferred.

Since the addition of calcium chloride or lithium chloride to the silicone finish tends to increase the fiber to fiber friction of the yarn, it is essential that this feature be controlled. Such control is effected by the addition of a polyhydric solubilizing agent so that the deliquescent salt remains in solution when being deposited on the fiber surface rather than being in a solid particle state. By the term "polyhydric solubilizing agent" as employed herein merely means any substance in which the calcium chloride or lithium chloride is soluble without displaying detrimental effects to the objects to be achieved. Thus, to successfully practice this invention, any glycol in which the calcium chloride or lithium chloride is soluble such as glycerine, ethylene glycol, hexamethylene glycol, or glycols of the formula $HO(CH_2CH_2O)_xH$, in which $x$ is any integer, is sufficient although glycerine is to be preferred due to its commercial availability.

The amount of polyhydric solubilizing agent employed is also critical since excessive quantities will deleteriously alter the viscosity of the emulsion so that the desired advantages will not be accomplished. The maximum amount of polyhydric solubilizing agent that can be used must not exceed 40 parts per 100 parts of (A). The minimum amount required is not critical with the exception that it must be present in sufficient quantities so that the calcium chloride or lithium chloride will be applied on the surface of the substrate in liquid form. Thus, for purposes of this invention as little as 10 parts of polyhydric solubilizing agent per 100 parts of (A) will suffice, although for best qualitative results from 20 to 35 parts of (C) per 100 parts of (A) is to be preferred.

The novel compositions of this invention are easily and readily prepared. The best method is to initially prepare an oil in water emulsion by admixing the dimethylpolysiloxane fluid and the polyhydric solubilizing agent in the presence of any of the common non-ionic emulsifying agents such as saponines; condesnation products of fatty acids with ethylene oxide such as dodecyl ether of tetraethylene oxide; condensation products of ethylene oxide and sorbitan monolaurate; condensation products of ethylene oxide and sorbitan trioleate and condensation products of phenolic compounds having side chains with ethylene oxide such as condensation products of ethylene oxide with isododecylphenol; and imine derivatives such as polymerized ethylene imine and N-octadecyl-N,N'-ethylene imide, among others. Subsequently, the calcium chloride or lithium chloride is then admixed with the above emulsion. To facilitate dispersion, it is preferred that the deliquescent salt be added in the form of an aqueous solution. In the preparation of the oil in water emulsion, addition of the necessary ingredients need not be in any specified order. The dimethylpolysiloxane fluid, polyhydric solubilizing agent, and non-ionic emulsifying agent can be admixed individually or in any combination. It is preferred that the appropriate emulsion be formed before the addition of the aqueous solution of calcium chloride or lithium chloride.

It is to be noted that water in the above emulsion can be added at any point prior to its application on the synthetic fiber. For example, all of the water can be added before addition of the calcium chloride and lithium chloride and then adding the calcium chloride or lithium chloride in undiluted form. Alternatively, any partial amount of the desired water can be added initially, the remainder being added in the form of an aqueous solution of calcium chloride or lithium chloride.

It is to be further noted that the presence of a minimum amount of water is to be preferred. Thus, although the total solids content of the emulsion can consist of 20 percent or more, it is preferred that said solids content be within a range of from 50 percent to 80 percent.

This invention also relates to a process of applying to a synthetic fiber, the novel compositions defined above.

It is to be noted that the novel fluids of this invention can be applied to the fibers in any convenient manner. The precise mode of application will depend largely upon the nature of the time of application, and the use for which it is intended. In general, the novel compositions can be applied by any of the standard procedures such as by dipping, padding, or spraying, or they can be applied in conjunction with any coating apparatus and machinery commonly used in the trade. Therefore, the method of application is not particularly critical and the novel compositions of this invention can be applied in any reasonable fashion best suited for the specific synthetic fiber to be coated.

It is to be further noted that the time of application is not critical. For example, in the fabric trade where the fiber undergoes numerous stages of processing while being manufactured into a finished fabric for consumption, the novel compositions of this invention can be applied at any step during the processing procedure and the advantages related herein will be obtained. Thus, for purposes of this invention application can be accomplished at the spinning, weaving, or reeling stage, or any stage attendant in fiber or fabric manufacture. In addition, application is not limited to any one stage, but can effectively occur at any individual stage, any selected number of stages, or all stages if desired.

Regardless of the method employed, the quantity of novel material applied on the surface of the synthetic fiber is not critical with the exception that it must be applied in sufficient quantity to achieve the related objects of this invention. Generally, any consistent application covering substantially the entire surface of the synthetic fiber will suffice. However, for optimum results, it is preferred that there be at least 0.1 percent siloxane polymer based on the weight of the fiber present. To achieve the objects of this invention no maximum quantity is critical, but an application in excess of 3.0 percent siloxane polymer based on the weight of the fiber would be both impractical and uneconomical.

This invention further relates to a synthetic fiber coated by the novel compositions and under the process as herein defined.

The term "synthetic fiber" is not all inclusive, but is restricted only to synthetic fibers consisting of the group selected from polyolefins and acrylics. Thus, any polyolefin or manufactured fiber in which the fiber-forming substance is any long chain synthetic polymer composed of at least 85 percent by weight of ethylene, propylene, or other olefin units can be effectively coated with the novel compositions of this invention and will exhibit exceptional antistatic and lubricity characteristics. In addition, any acrylic fiber or manufactured fiber in which the fiber-forming substance is any long chain polymer composed of at least 85 percent by weight of acrylonitrile units as well as modacrylics which contain less than 85 percent but at least 35 percent acrylonitrile units also can be coated with the novel compositions of this invention wherein the related advantages are derived.

Therefore, synthetic fibers such as polyethylene, polypropylene, acrylon, or any combination of a polyolefin and acrylic or modacrylic synthetic fiber can be coated with the novel compositions defined herein while obtaining prevention of accumulation of static electricity and maintaining remarkable lubricity characteristics.

The compositions of the following examples were tested by the methods below:

The yarn was tested for frictional characteristics against either a steel or ceramic spindle. The yarn was looped over the spindle with a tension at rest of about 80 grams. During the testing procedure the yarn traveled over the spindle at 100 yards per minute. The strain gauges recorded the difference in tension on the yarn before and after passing the spindle to yield a relative measure of the frictional force between the yarn and the spindle. The relative friction was expressed as a whole number, the lower frictions being expressed as lower whole numbers.

The static electricity generated on the yarn was also measured as a relative field strength.

The following examples are intended to aid those skilled in the art in understanding and practicing this invention. The examples do not delineate the scope of the invention.

Example 1

In this example polypropylene was coated with the novel compositions of this invention. The necessary ingredients were present in the weight ratio indicated, and was applied to the fiber in the concentrations listed. The following table specifies the results obtained.

| Test No. | Finish for Fiber | Weight Ratio | Conc. on Fiber | Friction Steel | Friction Ceramic | Static Electricity Steel | Static Electricity Ceramic |
|---|---|---|---|---|---|---|---|
| 1 | No Finish | | | 32 | 40 | 6 | 5 |
| 2 | DMP alone/350 cs | | 0.4% | 15 | 14 | 5 | 5 |
| 3 | DMP/CaCl₂ | 35/2 | 0.4% | 16 | 13 | 3 | 3 |
| 4 | DMP/CaCl₂/glycerine | 23.5/3/23/5 | 0.4% | >40 | >40 | 4 | 3 |
| 5 | do | 30/3/17 | 0.4% | >40 | >40 | 4 | 4 |
| 6 | do | 17/3/30 | 0.4% | >40 | >40 | 4 | 4 |
| 7 | do | 36/2/12 | 0.4% | 17 | 12 | 2.5 | 3 |
| 8 | do | 36/3/11 | 0.4% | 20 | 13 | 2.5 | 2.5 |
| 9 | do | 48/4/12 | 0.4% | 24 | 13 | 2 | 2 |
| 10 | do | 34/2/14 | 0.4% | 20 | 14 | 3 | 4 |

In the above table, DMP represents the dimethylpolysiloxane. The emulsion consisted of 50 percent total solids, and unless otherwise indicated, the viscosity is 1000 cps. at 25° C.

With no finish (Test 1), lubricity and antistatic characteristics are both poor. With the dimethylpolysiloxane fluid alone (Test 2), lubricity is good, but there is substantial accumulation of static electricity. With the dimethylpolysiloxane fluid and deliquescent salt but no polyhydric solubilizing agent (Test 3), the results are significant but this particular formulation is not to be desired for the reasons set forth in the specification. Tests 4, 5, and 6 show the deleterious results obtained when an excess of polyhydric solubilizing agent is employed. Tests 7, 8, 9, and 10 show the superior results obtained when the 3 necessary ingredients are maintained within preferred operative ranges.

Example 2

When the following parts of dimethylpolysiloxane fluid, calcium chloride, and glycerine are substituted for the parts indicated in Tests 7, 8, 9, and 10 of Example 1, equivalent results are obtained.

| DMP, parts | CaCl₂, parts | Glycerine, parts |
|---|---|---|
| 100 | 20.0 | 20 |
| 100 | 15.00 | 22.5 |
| 100 | 10.0 | 25 |
| 100 | 7.5 | 30 |
| 100 | 5.0 | 35 |
| 100 | 2.5 | 37.5 |
| 100 | 1.0 | 40.0 |

Example 3

When polyethylene and acrylon is substituted for the polypropylene fiber in Example 1, equivalent results are obtained.

Example 4

When lithium chloride is substituted for the calcium chloride in Example 1, equivalent results are obtained.

Example 5

When ethylene glycol and hexamethylene glycol are each substituted for the glycerine in Example 1, equivalent results are obtained.

Example 6

When concentrations of 0.1, 0.25, 0.5, 1.0, 2.5, and 5.0 percent of the fiber finish is applied to the fiber rather than the 0.4 percent of Example 1, equivalent results are obtained.

That which is claimed is:

1. An aqueous emulsion consisting essentially of water having dispersed therein,
    (A) a dimethylpolysiloxane fluid having a viscosity of at least 20 cps. at 25° C.,
    (B) from 1.0 to 20.0 parts by weight of a deliquescent salt selected from the group consisting of calcium chloride and lithium chloride based on 100 parts by weight of (A), and
    (C) from 20.0 to 40.0 parts by weight of a polyhydric solubilizing agent selected from the group consisting of glycerine, ethylene glycol, and hexamethylene glycol, for the deliquescent salt based on 100 parts by weight of (A) the total solids content of said emulsion being in the range of 20% to 80% by weight.

2. The aqueous emulsion as recited in claim 1 wherein (B) is calcium chloride.

3. The aqueous emulsion as recited in claim 1 wherein (B) is lithium chloride.

4. The aqueous emulsion as recited in claim 1 wherein (C) is glycerine.

5. The aqueous emulsion as recited in claim 1 wherein (A) is 100 parts by weight, (B) is within a range of from 4.0 to 8.0 parts by weight, and (C) is within a range of from 25 to 35 parts by weight.

6. The method of treating a fiber for the purpose of imparting antistatic and lubricity characteristics to said fiber which comprises
    (A) applying to a synthetic fiber selected from the group consisting of polyolefins and acrylics, the aqueous emulsion as recited in claim 1, and
    (B) thereafter drying said synthetic fiber.

7. The method as recited in claim 6 wherein the synthetic fiber is coated with at least 0.1 percent of the siloxane polymer based on the weight of the fiber.

8. The method as recited in claim 6 wherein the synthetic fiber is polyethylene.

9. A synthetic fiber selected from the group consisting of polyolefins and acrylics coated in accordance with claim 6.

10. A polypropylene fiber coated in accordance with claim 6.

References Cited

UNITED STATES PATENTS 2,590,659  3/1952  Skalkeas _____ 252—8.6
2,597,614  5/1952  Brown et al. _____ 252—8.6
2,838,455  6/1958  Tompkins _____ 252—8.6

HERBERT B. GUYNN, *Primary Examiner.*

U.S. Cl. X.R.
117—138.8, 139.5